United States Patent [19]

Hoshino et al.

[11] Patent Number: 4,903,060
[45] Date of Patent: Feb. 20, 1990

[54] FILM FEEDING DEVICE OF THE CAMERA

[75] Inventors: Yasushi Hoshino, Tokyo; Hiroyuki Horiuchi; Yasutsugu Nakagawa, both of Hamura, all of Japan

[73] Assignee: Konica Corporation, Tokyo, Japan

[21] Appl. No.: 305,812

[22] Filed: Feb. 3, 1989

[30] Foreign Application Priority Data

Feb. 9, 1988 [JP] Japan ................... 63-26697

[51] Int. Cl.$^4$ ............................... G03B 1/18
[52] U.S. Cl. ................... 354/173.1; 354/214
[58] Field of Search ............... 354/173.1, 173.11, 112, 354/114, 212, 214

[56] References Cited

U.S. PATENT DOCUMENTS

2,680,400  6/1954  Smith .................................. 354/114
4,281,911  8/1981  Engelsmann et al. ............ 354/173.1
4,676,621  6/1987  Malloy Desormeaux ....... 354/173.1

Primary Examiner—L. T. Hix
Assistant Examiner—Brian W. Brown
Attorney, Agent, or Firm—Finnegan, Henderson, Farabow, Garrett and Dunner

[57] ABSTRACT

Disclosed is a photographic film-feeding apparatus for positioning picture frames of a film to an exposure position in a camera, wherein there is provided a feeding mechanism which is controlled so as to wind or rewind the film by two frames in response to every picture-taking operation. When starting the rewinding process, the feeding mechanism is further controlled so that the film is rewound so as to position a picture frame being adjacent to the latest exposed frame in the winding process to the exposure position and thereafter the film is rewound by two frames.

3 Claims, 12 Drawing Sheets

→ FORWARD ROTATION

--→ REVERSE ROTATION

FIG. 13a  WHEN STOPPAGE OCCURS BEFORE WINDING ONE FRAME

FIG. 13b  WHEN STOPPAGE OCCURS AFTER WINDING MORE THAN ONE FLAME AND LESS THAN TWO FRAMS

FIG. 14

DETECTION OF STOPPAGE

FIG. 15

DETECTION OF STOPPAGE

FIG. 16  RETURN PATH

FIG. 17  FILM WINDING PROCESS

FILM FEEDING DEVICE OF THE CAMERA

BACKGROUND OF THE INVENTION

This invention relates to a film feeding device which winds up and rewinds film by means of an electric motor, in particular, to a film feeding device which efficiently feeds film by two frames.

Recently, in keeping with camera automation, the automation of film feed with a motor drive is promoted in the auto load (automatic loading), auto wind (automatic winding), and auto rewinding. Every function employs the method in which film is fed per frame in the direction of winding and is rewound upon completion of winding. Also, a preloading system is available which exposes the film while rewinding after the whole film has been wound up. The principle employed is the same as that above.

In these conventional devices, it takes several minutes to rewind and preload film because the whole film is rewound and woundup when the power supply voltage drops. This presents an obstacle if one wishes to shoot the succeeding object immediately. Also, when rewinding is suddenly activated and quietness is an issue in, for example, a wedding ceremony or concert, noise and time can be great inconveniences in a camera with an autoreturn device. To reduce rewinding time, film feed speed is increased. However, a great reduction of rewinding time cannot be expected due to the relation between the power supply and torque required. Also, it is impossible to eliminate noise completely; cost is also a factor in this.

SUMMARY OF THE INVENTION

This invention aims to eliminate the aforementioned disadvantages. It aims to reduce film rewinding time in the film feed device which winds up and rewinds film using a motor.

Figure 1:
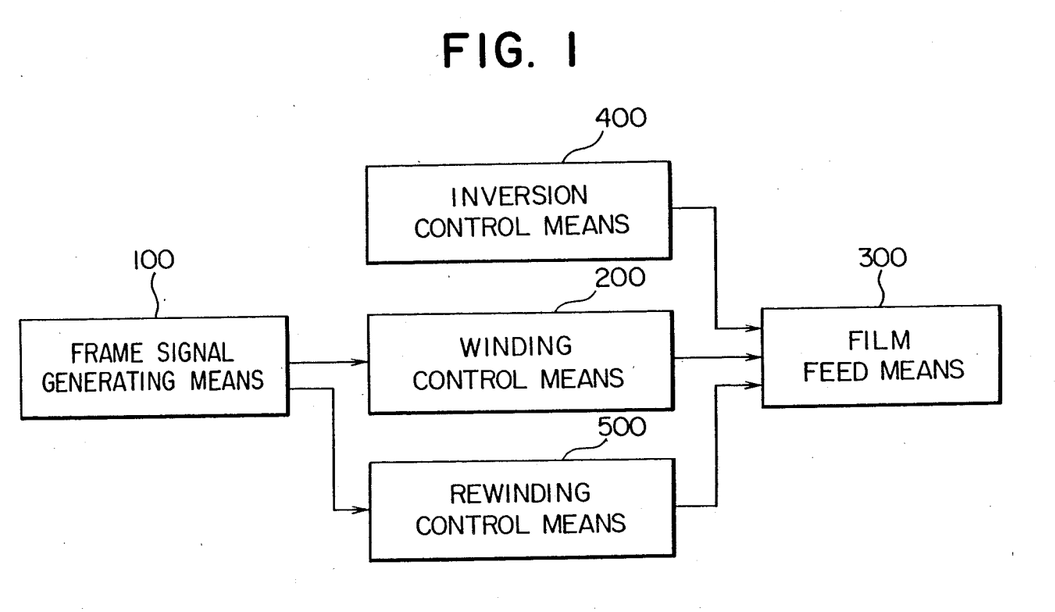
FIG. 1 is a block diagram which shows the film feed device of camera.

This invention achieves the stated objective as shown in FIG. 1 by outputting an electrical signal which distinguishes one frame as the film is fed in synchronization with photographying operation, and by controlling film feed mechanism 300 in such a way that film is wound by two frames by winding control mechanism 200 based on the output signal from the frame signal generating means. Film feed is reversed when the final exposure frame during winding is sensed by inversion control mechanism 400 or return control means, and film rewinding is started. Film feed mechanism 300 is controlled based on the output signal of the frame signal generating means by rewinding control mechanism 500 after frame rewinding is started. The film is rewound so that the frame which is adjacent to the final exposure frame during winding is exposed in synchronicity with shooting, and after this, two frames are rewound so that the unexposed sections of the film can be exposed.

A DETAILED DESCRIPTION OF THE INVENTION

Figure 2:
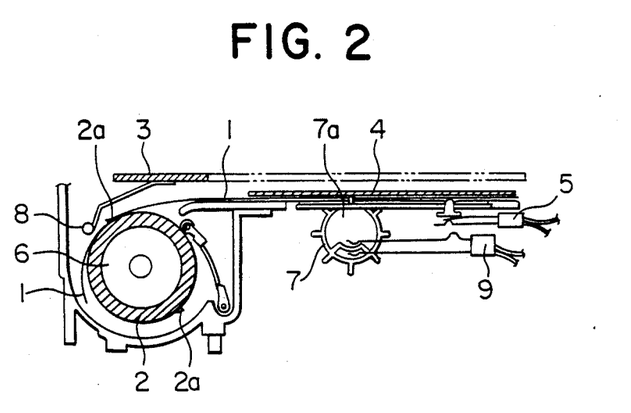
FIG. 2 is a drawing which illustrates the auto load mechanism in a model of this invention.

This invention is described by means of drawings. FIG. 2 is a view which shows auto load mechanism in the film feeding device, and when the tip of film 1 is loaded on reel 2 and rear lid 3 is closed, film 1 is pressed against pressure plate 4, and SF switch (film switch) 5 is turned on. When the shutter release is depressed lightly in one step, the motor drive circuit is activated and motor 6 starts its rotation. The winding drive mechanism which is described hereinafter operates by rotation of motor 6, and sprocket 7 and reel 2 are rotated. Film 1 is fed by the rotation of sprocket 7, film perforation engages with the claw section 2a of reel 2 in the vicinity of rear lid guide roller 8 to wind film 1 around reel 2. Print plates 7a and 7b are mounted on one side of sprocket 7, and the contact piece of SSP switch (sprocket switch) contacts these print plates 7a and 7b. SSP switch 9 is turned on or off in accordance with rotation of sprocket 7. Sprocket 7 is designed so that it rotates by one revolution when one frame is sent. SSP switch 9 also outputs an on-off or off-on signal (hereinafter referred to as SSP signal) for each frame. Motor 6 is driven based on SSP signal and film 1 is wound forward rapidly by four frames. Thus, auto load ends.

Figure 3:
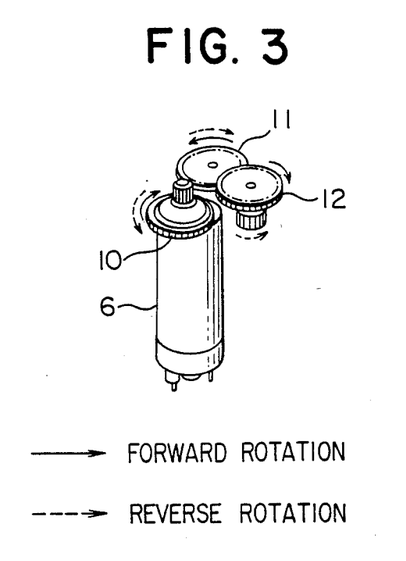
FIGS. 3, 4, 5, and 6 illustrate film winding and rewinding mechanisms.
Figure 4:
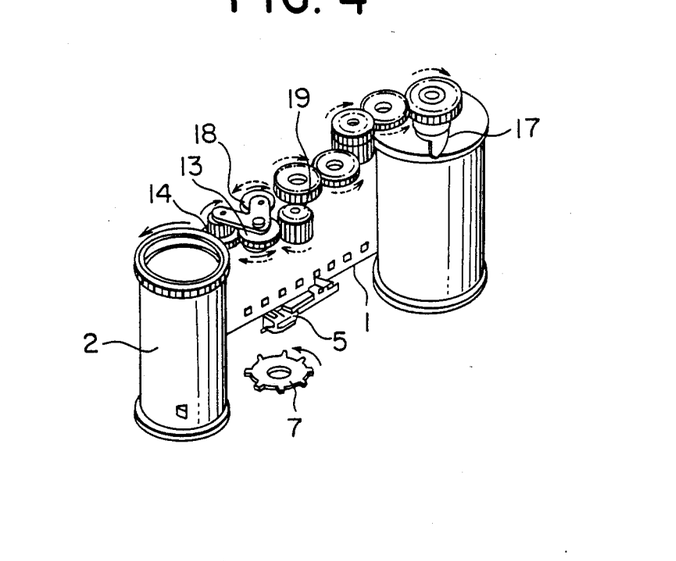

FIGS. 3 and 4 show film winding and rewinding mechanisms, and the same reference number as those in FIG. 2 are given to the corresponding sections.

Figure 5:
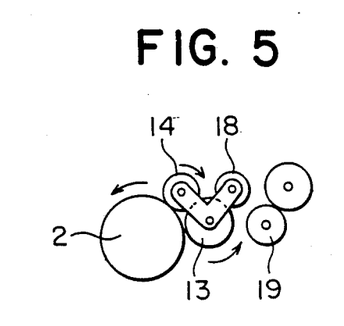

When motor 6 rotates forward, the gear which is mounted to motor 6 rotates in the arrow direction, and the first gear 10, the second gear 11, and the third gear 12 which are engaged with it, rotate. The third gear 12 further rotates drive gear 13 and reel intermediate gear 14, and rotation is transmitted to reel 2. Film 1 is wound to reel in the tightly wound condition by engaging with the claw section 2a of reel 2, and film 1 is wound up. FIG. 5 shows the condition where gears engage at the time of winding, in which the rotation force of motor 6 is transmitted to reel 2 side only, and not transmitted to rewinding shaft 17 side.

Figure 6:
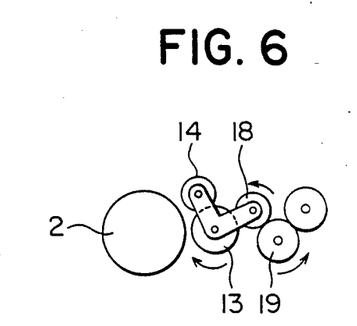

On the other hand, motor 6 rotates in reverse at the time of rewinding, and as shown in FIG. 6, the intermediate gear 14 is removed from reel 2, sprocket intermediate gear 18 engages with the first gear 19, and the rotating force of motor 6 is transmitted to rewinding shaft 17. Thus, rewinding is done.

Figure 7:
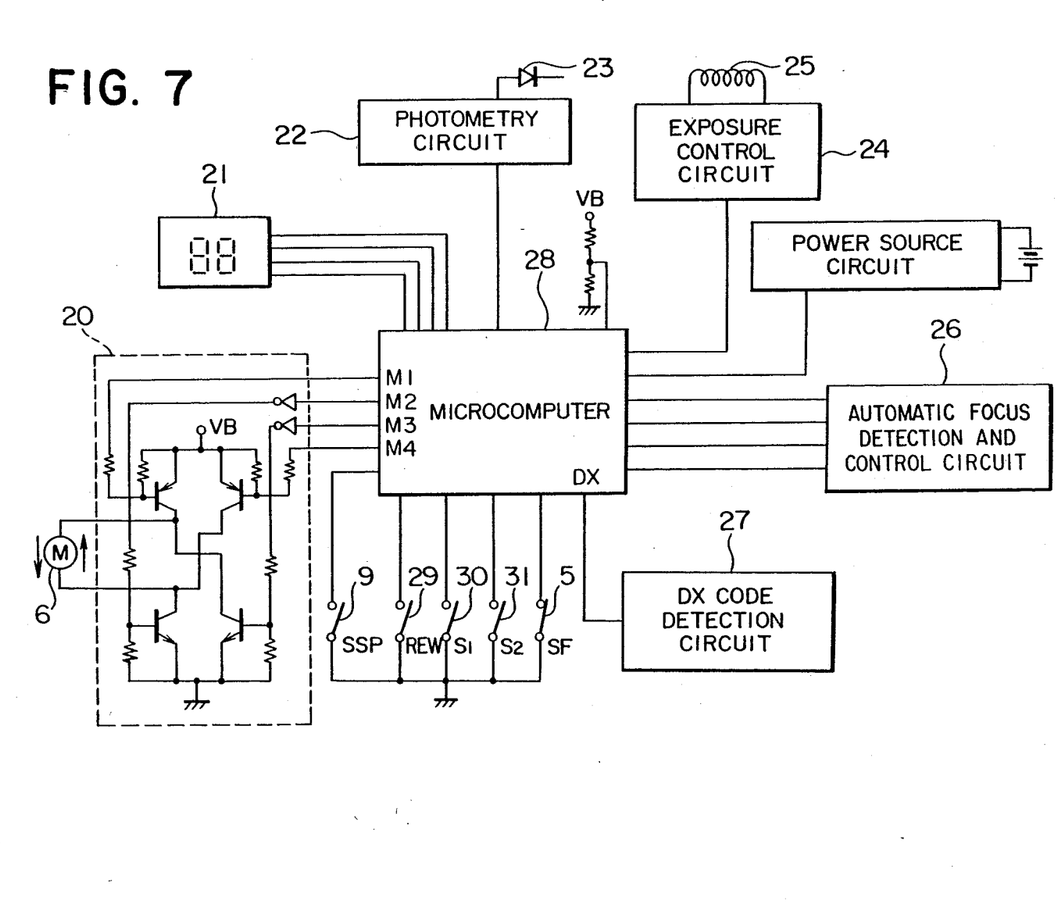
FIG. 7 is a block line diagram which shows the circuit composition of a model.

FIG. 7 is a block diagram which shows the electrical circuit of the film feed device, and the same reference numbers as those in FIG. 2 are given to the corresponding sections.

In the diagram, 20 denotes the motor drive circuit which controls rotation of motor 6, 21 denotes the film counter consisting of LCD which displays the number of film that are shot, 22 denotes the photometry circuit which measures the brightness of an object by photodiode 23, 24 denotes the exposure control circuit which controls the shutter speed by turning magnet 25 on or off in accordance with the brightness of the object, 26 denotes automatic focus detection and the control circuit which detects lens focus and moves the lens to the focus position, 27 denotes the DX code detection circuit which reads the DX code on a film cartridge, and 28 denotes the microcomputer which controls each section of the device.

Next, switches are described 29 denotes the rewind switch which is turned on at the time of rewinding, 30 denotes the S1 switch which is turned on when the release button is depressed by one step, and 31 denotes the S2 switch which is turned on by depressing the release button further.

Motor drive circuit 20 consists mostly of four transistors, and the forward and reverse rotation of motor and the brake are controlled by the outputting control signal from output ports, M1 to M4, of the microcomputer, to the base of each transistor.

| Motor | Forward rotation | Reverse rotation | Brake | Initial condition |
|---|---|---|---|---|
| M1 | 0 | 1 | 1 | 1 |
| M2 | 0 | 1 | 0 | 1 |
| M3 | 1 | 0 | 0 | 1 |
| M4 | 1 | 0 | 1 | 1 |

The direction of the drive current of motor 6 is switched from forward to reverse rotation by the transistor, and the brake is applied by counter-electromotive coil force in motor 6 caused by putting both terminal of motor 6 into ground so that motor 6 does not overrun.

Operation in the model is described in flow charts and a timing chart. The symbols used in the flow charts are defined as follows.

Figure 8:
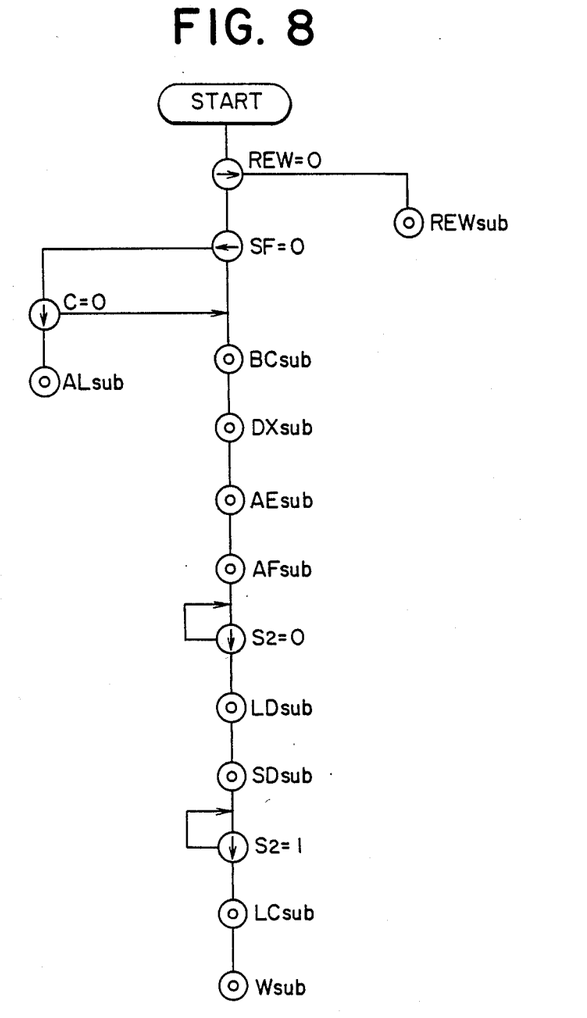
FIG. 8 is a flow chart which shows the whole shooting sequence.

- ⊕ : Judgement (If the condition described on the right side of the symbol is satisfied, operation advances in the arrow direction.)
- ⊚: Sub-routine
- ○: Processing (The processing described on the right side of symbol is completed.)
- ⌀: Timer set FIG. 8 is a flow chart which shows the whole shooting sequence. The start of this sequence begins only when the conditions REW=0 or S1=0 are met. First, when rewinding switch 29 is turned on (REW=0), the rewinding sub-routine is executed (REW Sub) to rewind film. If rewinding switch 29 is not on, it automatically determines that the S1 switch is on (S1=0), and further judges on or off of SF switch 5. If the SF switch is on (SF=0), it checks whether the C counter which counts the number of frames is 0 or not (C=0); if it is 0, auto load sub-routine is executed (AL Sub). If the film is loaded, each subroutine for battery check (BC Sub), DX code reading (DX Sub), and distance measurement (AF Sub) is executed in order. When the release button is depressed another step, switch S2 is turned on (S2=0), sub-routines for lens drive (LD Sub) and shutter drive (SD Sub) are executed. If the finger is removed from the release button, switch S2 goes off (S2=1), and lens charge (LC Sub) and film winding (W Sub) are done.

Figure 9:
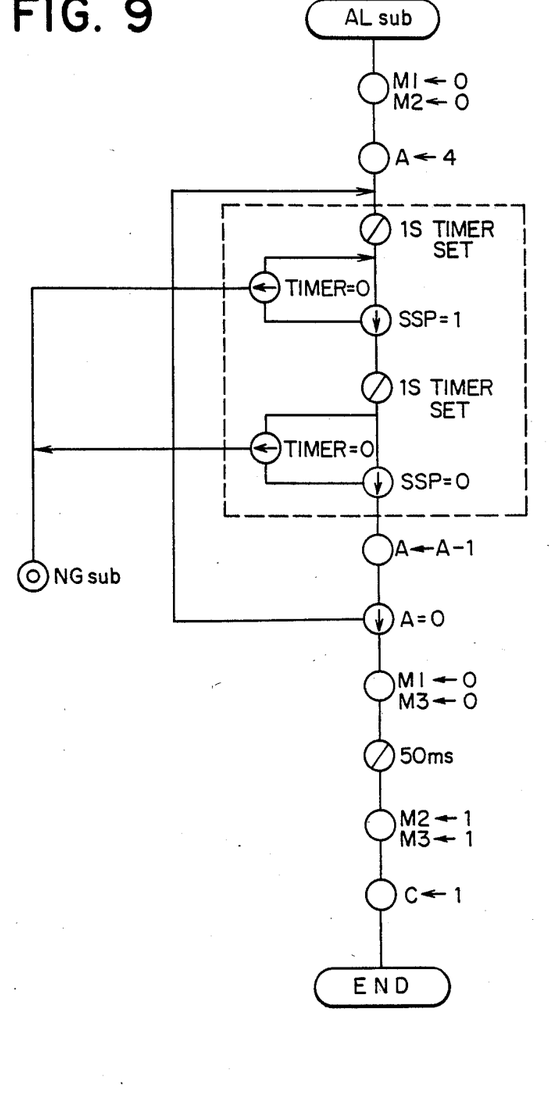
FIG. 9 is a flow chart which shows the auto load sub-routine.
Figure 10:
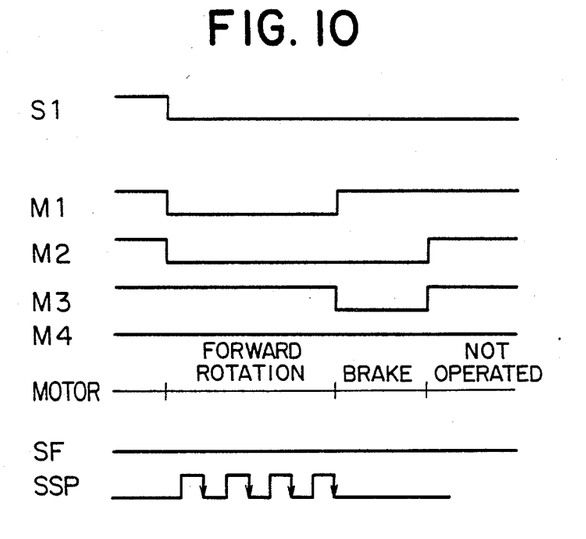
FIG. 10 is a timing chart.

FIG. 9 shows an auto load sub-routine (AL Sub), in which firstly the output ports M1 and M2 of the microcomputer are set to "0" (M1←0, M2←0), the motor 6 is rotated forward, A counter is set to 4 (A←4), and the timer is set for one second (1s Timer Set). If SSP switch 9 turns off within one second (SSP=1), the flow advances, and if one second elapses without the switch being off (Timer=0), operation will advance to NG sub-routine (NG Sub) because it is an abnormal condition. A warning is given by the flickering of film counter 21. Next, the timer is set for one second (1s Timer set), and when SSP switch 9 is turned on (SSP=0), this loop is continued until A counter becomes 0. That is, in the step surrounded by broken line X1, falling edge of SSP signal is detected. Film is deemed to advance by one frame per falling edge. When four falling edges are detected, that is, when film is deemed to be wound by four frames, output port M1 and M3 are set to "1" and "0", respectively, to apply brake to motor 6 (M1←1, M3←0). After 50 msec elapses, set output ports M2 and M3 to "1" to return to initial condition (M2←1, M3←1) and set C counter which counts the number of films to 1 (C←1). FIG. 10 is a timing chart which shows the signal of each section when the above auto load sub-routine is executed.

In a conventional device, three frames are usually wound forward rapidly. In this model, however, four frames are wound forward rapidly, in order to use the fourth frame as the final exposure frame at the time of rewinding. Of course, three frames may be wound forward rapidly as is usual. In this case, shooting for the first time is started at the fourth frame and the fifth frame becomes the final exposure frame at the time of rewinding.

Figure 11:
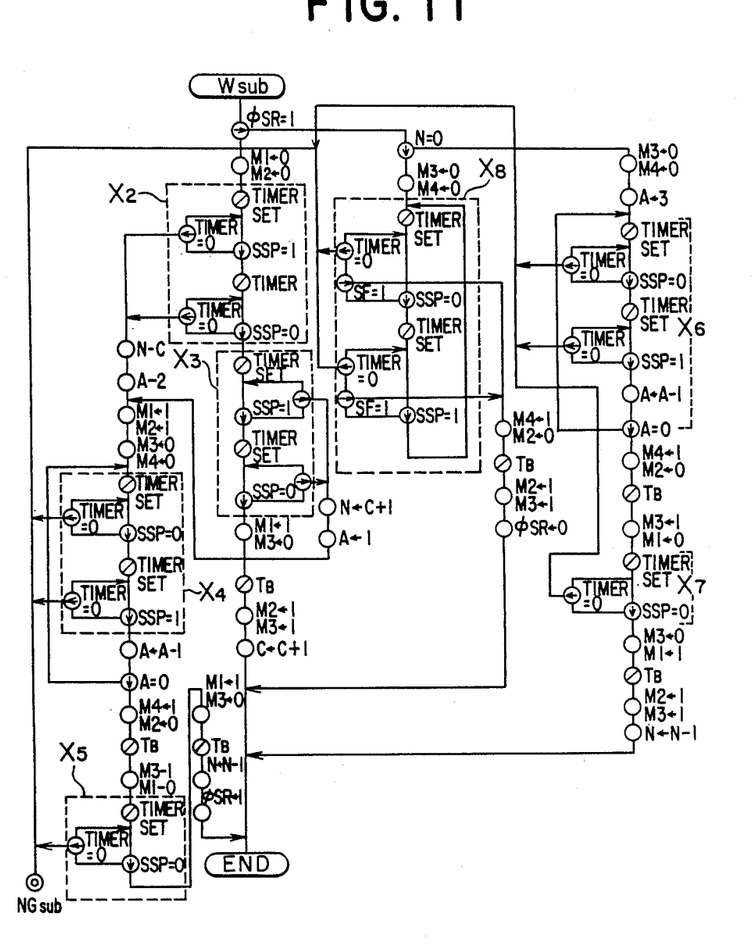
FIG. 11 is a flow chart of winding and rewinding sub-routines.

Next, winding and rewinding operations are described based on the flow chart in FIG. 11.

Flag ΦSR is mounted in microcomputer 28. It is set to 0 in the forward path at which film is wound from film cartridge (ΦSR=0) and to 1 in the return path at which film is rewound into film cartridge (ΦSR=1).

First, operation in the forward path is described. Motor 6 is rotated forward when ΦSR=0 (M1←1, M2←0), and when falling edge of the SSP signal is detected in the steps X2 and X3 surrounded by broken line, that is, when film is fed by two frames, a brake is applied to motor 6 (M1←1, M3←0).

Figure 12:
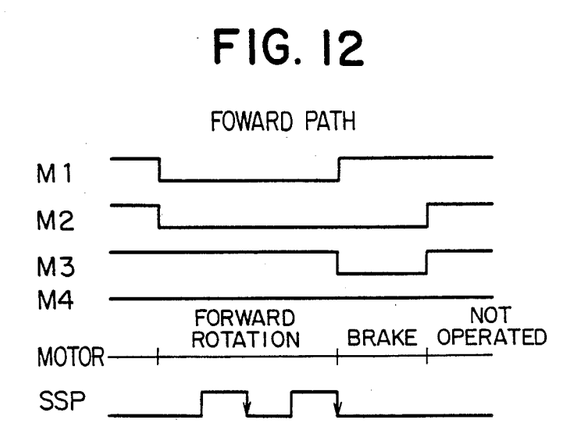
FIG. 12 is a timing chart which shows the winding operation in the first half of the path.

After the predetermined time set bytimer T0 (for example, 50 msec) elapses, the output port is set to initial condition (M2←1, M3←1), and C counter is increased (C←C+1). FIG. 12 shows a timing chart in the forward path. As shown in the chart, when two falling edges of the SSP signal are detected, that is, when the film is advanced by two frames, motor 6 stops.

Thus the film is wound up completely, tensed and stops at the end. Motor 6 is rotated in reverse when this tensing is detected in order to start rewinding. Next, the detection of tensing is described.

Figure 13A:
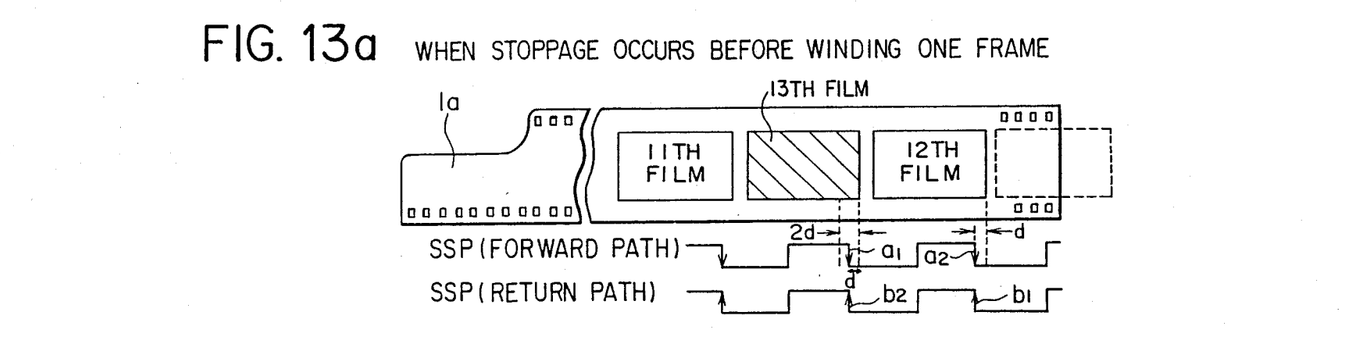
FIG. 13 is a drawing which illustrates operation during the inversion of film feed.
Figure 13B:
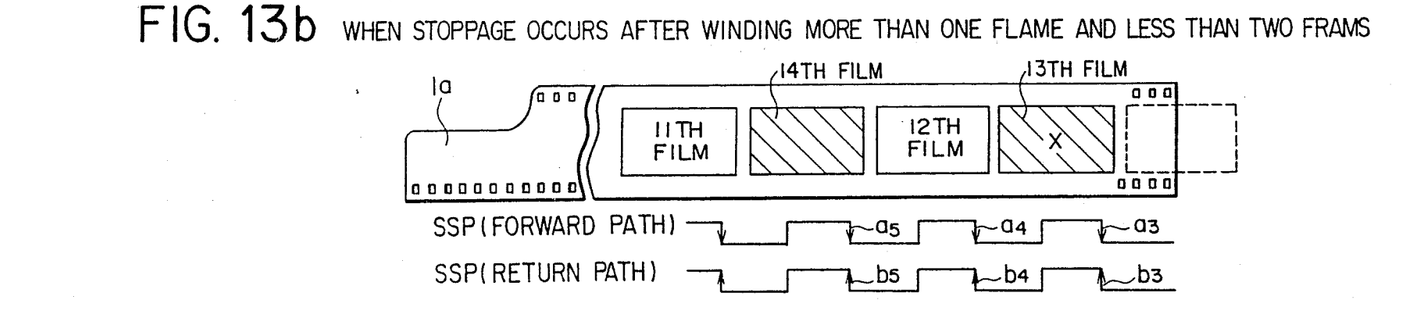

FIG. 13 shows the final step of the winding of a 24-frame film. This drawing shows that the picture frame to be exposed moves from left to right in the foward path and from right to left on the return path without moving film.

There are cases in which the film is tensed and stops as in the following: When it is tensed after winding less than one frame, as is shown in (a) of FIG. 13; when it is tensed after winding one frame and more, or less than two frames as shown in (b). In the case of (a), film is so wound that the picture frame is positioned at the frame (13th frame shown in the shadowed section) of adjacent at the leading end side 1a of the film to the exposed frame which is shot last (12th frame in the case of (a) in FIG. 13) in the foward path. In the case of (b), rewinding is done so that the picture frame is positioned at the frame adjacent to the left of the 12th frame so as to be the 13th frame in the same way as the above. In that case, however, unexposed frame X, which is adjacent to the right of the 12th frame, becomes useless. Therefore, the picture frame is positioned at frame X which is adjacent to the right of the 12th frame and is used as the 13th frame in this model.

To achieve this, motor 6 is rotated in reverse after the film has been tensed and motor 26 is stopped when rising edges b1 and b2 of SSP signal (see (a) in FIG. 13) are detected in the case of (a). However, overrun of film occurs due to inertia even after motor 6 is stopped. It is therefore necessary to move back film by the amount of the overrun. Motor 6 stops when falling edges a1 and a2 of SSP signal are detected in the foward the path, but the film overruns slightly by distance d. Since the position of the 13th frame deviates by the same amount, the distance of 2d deviates in the case where motor 6 is stopped after the rising edge b2 of SSP signal is detected in the return path because overrun in the return path direction is added. Therefore, there is the danger that the 13th frame may overlap the 11th frame. If motor 6 is rotated forward again after the rising edge b2 is detected and motor 16 is stopped when the falling edge a1 is detected in the return path, an overrun of the same distance as in the foward path d, occurs, thus placing the picture frame to the position of the 13th frame.

In the case of (b) in FIG. 13, motor 6 rotates in reverse after the tensing is detected, and it is stopped when the rising edge b3 of SSP signal is detected. Motor 6 is rotated forward again and is stopped when falling edge a3 is detected. In the case of (b), as is evident from the drawing, shooting one more frame becomes possible than in the case of (a). That is, if the number of exposable frames in the foward path is N, the number of frames which can be shot in the return path is N in the case of (a). In the case of (b), however, the number of frames which can be shot becomes N + 1.

The description is continued with the flow chart in FIG. 11.

Figure 14:
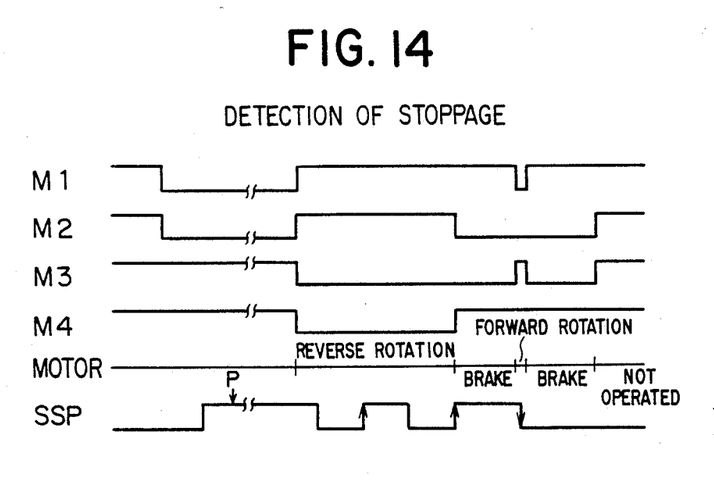
FIGS. 14 and 15 are timing charts which detect stoppage during winding.

If the film is tensed and stops, the SSP signal does not change, thus enabling the detection of the tensing. If time increases without a change in the SSP signal in step X2, that is, when the time set by the timer elapses without a change in the SSP signal by winding the film less than one frame as shown at point P in the timing chart of FIG. 14, the value counted by C counter is set to N counter (N←C). The value of the N counter indicates the number of frames which allow shooting in the return path, and two-frame feed in the return path is done until N becomes 0. Furthermore, 2 is set to A counter (A←2), and motor 6 rotates in reverse (M1←1, M2←1), (M3←0, M4←0). Since the film feed direction is reversed in the return path, an advance of the frame is detected by the rising edge of the SSP signal (see FIG. 13). After the rising edge of the SSP signal is detected in step X4, A counter is decremented (A←A−1), and when two rising edges are detected (A=0), the brake is applied to motor 6 to stop it (M4←1, M2←0). After the predetermined time TB elapses, motor 6 is rotated forward (M3←1, M1=0). When the falling edge of the SSP signal is detected in step X5, the brake is applied to motor 6 (M1←1, M3←0). After the predetermined time TB elapses, N counter is decremented (N←N+1), and φSR flag is set to "1" (φSR←1).

Figure 15:
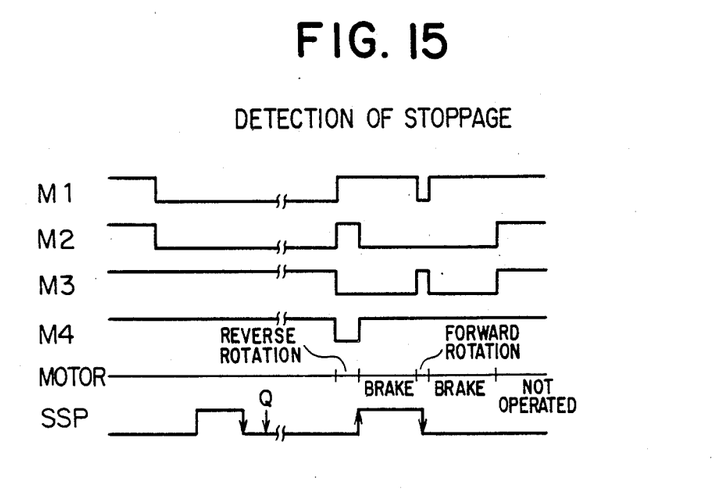
Figure 16:
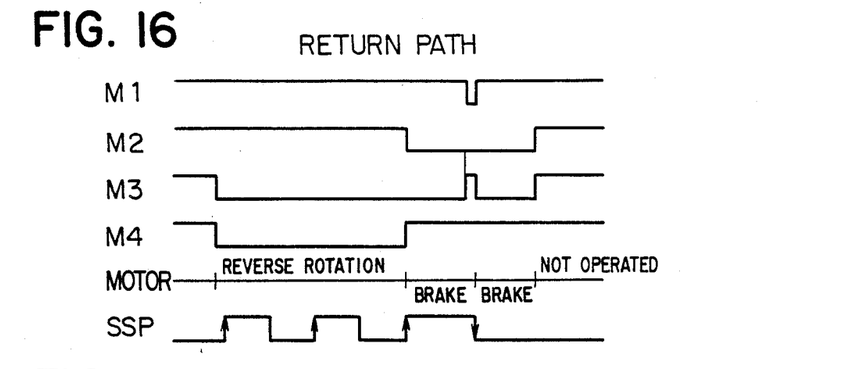
FIG. 16 is a timing chart which shows rewinding operation in the return path.

When time-up is done in step X3, that is, when more than one frame and less than two frames are wound and tensed as shown at point Q in the timing chart in FIG. 15, count value C+1 is set in N counter (N←C+1). As has been described previously, one more frame can be shot in this case than in the case where less than one frame is left and tensed. Next, A counter is set to 1 (A←1) to detect one rising edge of the SSP signal (see b3 of (b) in FIG. 13). The operation after this is the same as that when less than one frame is left and tensed. Next, rewinding in the return path is described. If the φSR flag is set to 1 and N counter does not indicate 0, motor 6 is rotated in reverse (M3←0, M4←0). After A counter is set to 3 and three rising edges of the SSP signal are detected in step the X6, brake is applied to motor 6 (M4←1, M2←0) to stop it. When the film feed from the 13th frame to the 14th frame is taken into consideration in the example of (b) in FIG. 13, the 13th frame is at the position where motor 6 is rotated fowardly after the rising edge b3 of the SSP signal is detected and motor 6 is stopped after falling edge a3 is detected. Since the 14th frame is at the position corresponding to rising edge b5, it is necessary to detect three rising edges, b3, b4, b5, by rewinding the film in order to feed the film from the 13th frame to the 14th frame. This detection is done in step X6. After this, the brake is applied to motor 6 (M4←1, M2←0), and after the predetermined time TB elapses, motor 6 is rotated forward (M3←1, M1←0). The brake is applied to motor 6 (M3←0, M1←1) after the falling edge of the SSP signal is detected in step X7 (equivalent to a5 in (b) in FIG. 13). The output port is returned to the initial condition after the predetermined time TB elapses (M2←1, M3←1), and N counter is decremented (N←N−1). FIG. 16 is a timing chart which shows the film rewind operation in the return path. Motor 6 is rotated forward because the overrun amount of the film is compensated (see d in (a) in FIG. 13).

Figure 17:
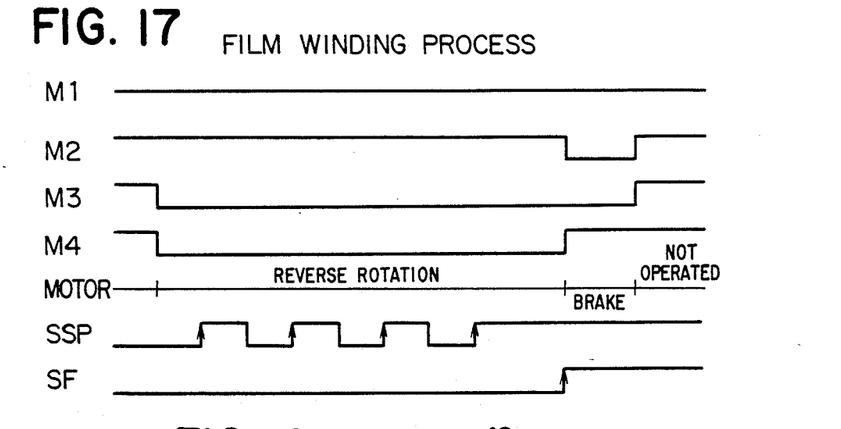
FIG. 17 is a timing chart which shows the film winding process.

When film is sent by two frames in the return path and N count becomes zero (N=0 in FIG. 11), all the film is shot. Automatic transmission 6 rotates in reverse (M3←0, M4←0), and rewinding of the film into a film cartridge is done. The raising edge of the SSP signal is detected repeatedly in step X8, and when the SF switch is turned off in the process (SF=1), that is, when all the film is rewound in cartridge, a brake is applied to motor 6 (M4←1, M2←0). The output port returns to its initial condition after the predetermined time TB elapses (M2←1, M3←1), and the φSR flag is set to "0" (φSR←0). FIG. 17 is a timing chart which shows the above film rewinding process.

Next, the second embodiment of this invention is described. The hardware configuration of this version is the same as that in the first model, and is shown by block diagram in FIG. 7. In this version, however, the film feed does not reverse after it detects film tensioning. Instead, the rated number of the film is read in advance from the DX code which is provided on the film cartridge (this number of film is specified as DX), and when DX/2 is wound in the foward path, the film feed is reversed, starting to rewind in the return path. The operation is described based on the flow chart in FIG. 18. The rated number of the film, DX, is read from the cartridge in advance by the DX code detection circuit 27 and stored in the memory in microcomputer 28.

Figure 18:
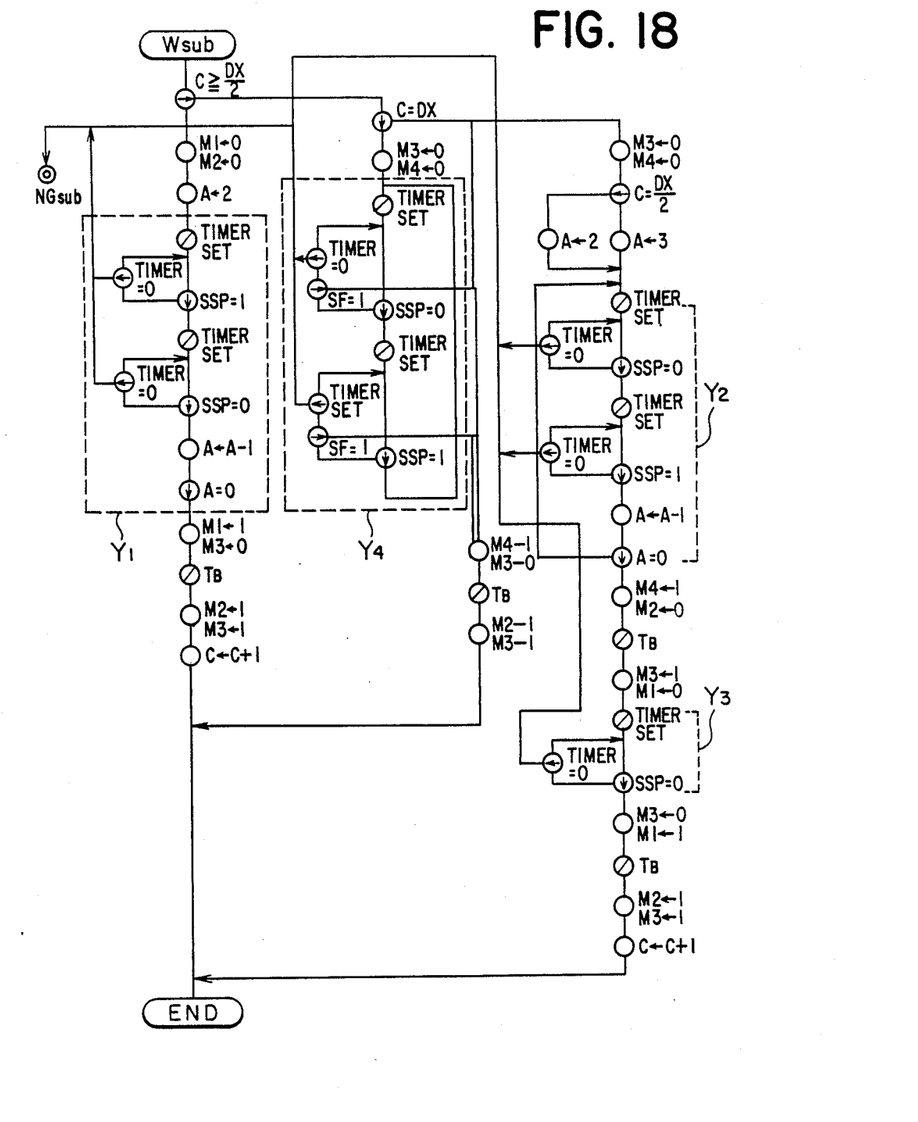
FIG. 18 is a flow chart which illustrates the operation of another model of the film feed counting device according to this invention.

First, it as certains whether the C count value is DX/2 or more (C←DX/2); and if it is not, motor 6 is rotated forward (M1←0, M2←0), A count is set to 2, and two falling edges of the SSP signal are detected at step Y1. That is, when the film is fed by two frames, a brake is applied to motor 6 (M1←0, M3←0), the output port returns to its initial condition after the predetermined time TB elapses (M2←1, M3←1), and C counter is incremented (C←C+1).

If the value of the C counter exceeds DX/2 in the foward path, motor 6 is rotated in reverse if C is not DX (M3←0, M4←0), and film rewind is started.

At this time, if C=DX/2, A counter is set to 2 (A←2), and if C≠DX/2, A counter is set to 3. Two or three rising edges of the SSP signal are detected in step Y2 in order to wind only one frame, if it is DX/2, so that the frame adjacent to the final exposure frame (for example, the 12th frame in the example in FIG. 13) is exposed; and to wind two frames, if C≠DX/2. Upon completion of winding the predetermined number of frames, a brake is applied to motor 6 (M4←1, M2←0). After the predetermined time TB elapses, motor 6 is rotated forward. After the falling edge of the SSP signal is detected in step Y3, a brake is applied to motor 6 (M3←0, M1←1). After the predetermined time TB elapses, the output port returns to its initial condition (M2←1, M3←1), and C count value is incremented (C←C+1). If C=DX, the winding process winds the film into the cartridge because shooting of the rated number of frames is completed. That is, motor 6 rotates in reverse (M3←0, M4←0), and the rising edge of the SSP signal is detected repeatedly in step Y4. If SF step 5 is turned off in the process (SF=1), that is, when the whole film is wound in the cartridge, a brake is applied to motor 6 (M4←1, M2←0) and the output port returns to its initial condition after the predetermined time TB elapses (M2←1, M3←1).

Figure 19:
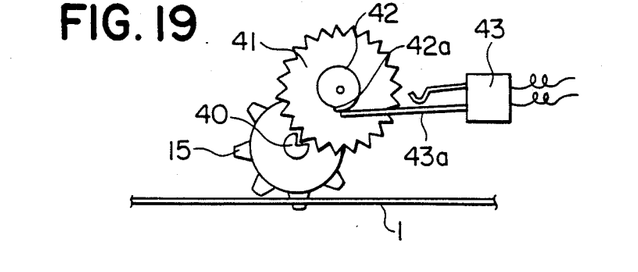
FIG. 19 is the plan of a switch-to-start film winding process.

Please note that the film winding process is activated when N=0 in the model in FIG. 11 and when C=DX in the model in FIG. 19. To determine the time for starting the winding process, a mechanical switch may be used as shown in FIG. 19.

In the drawing, 40 denotes a claw which is connected with sprocket 15 co-axially and rotates with sprocket 15, 41 denotes a gear which is engaged with claw 40, 42 denotes a cam which is formed integrally with the gear 41, 43 denotes a condition switch which is turned off by cam 42, and sprocket 15 consists of gear 8 and rotates one revolution per frame. When sprocket 15 rotates by one revolution, claw 40 also rotates, and gear 41 rotates by one tooth because the teeth of the gear 41 enter the slit of claw 40. When the circular section of claw 40 enters the bottom of the teeth of gear 41, gear 41 stops. Cam 42 contacts the cut piece 43a of the condition switch 43, and step 42a is formed in the cam 42 so that the condition switch 43 is turned on or off when auto loading of the film ends. Accordingly, the condition switch 43 remains on when the film is not loaded and stays off when the film is wound after auto loading ends. When the film is rewound, sprocket 15 rotates in reverse, and gear 41 also rotates in reverse. The condition switch 43 is off up to the auto loading end position of film. When the film is rewound up to the auto loading end position, the condition switch 43 is turned on. Accordingly, the film's winding process starts when the condition switch 43 is switched from on to off.

In the above model, the contents of flag φSR, the N counter, and C counter are stored in a semiconductor memory. This memory is a non-volatile memory, or is backed up by another power supply so that the film feed condition (in the foward path or the return path) and the number of frames which are wound or rewound can be understood. This memory system is not restricted to a semiconductor memory and may employ other means such as a switch.

In a camera which is provided with a film feeding device according to this invention, it is preferable to employ an electronic display counter since the mechanism becomes complicated if a conventional counter is used as a film counter.

As has been described at length above, when film is shot and rewound in conjunction with this invention, film rewinding time after shooting is made negligible, thereby eliminating problems such as a lost photo opportunity due to the time involved in rewinding the film in a conventional manner, as well as removing the unwanted generation of noise.

What is claimed is:

1. A photographic film-feeding apparatus for positioning picture frames of a film to an exposure position of a camera comprising, a film-feeding means for winding and rewinding a film in said camera by using an electric motor;

a frame signal-generating means for generating a frame signal representing a picture frame passing through the exposure position while the film is wound or rewound by said film-feeding means;

a wind control means for controlling said film-feeding means to wind the film by two frames based on the frame signal from said frame signal-generating means in response to every picture-taking operation;

a return control means for letting said film-feeding means to start rewinding the film when judging the latest exposed frame to be the last picture frame in the winding process; and a rewind control means for controlling said film-feeding means to rewind the film so that, when starting the rewinding process, the film is rewound so as to position a picture frame being adjacent to the latest exposed frame in the winding process to the exposure position on the basis of the frame signal from said frame signal-generating means, and thereafter the film is rewound by two frames in response to every picture-taking operation.

2. The photographic film-feeding apparatus of claim 1, wherein the last picture frame in the winding process is determined by said return control means by sensing the end of the film when winding the film in said winding process, and wherein, if the end of the film is sensed after winding the film less than one frame, the first picture frame of the rewinding process is set to be adjacent to the last frame in the winding process on the leading side of the last frame, while, if the end of the film is sensed after winding the film less than two frame, the first frame is set to be adjacent to the last frame on the end side of the last frame.

3. The photographic film feeding apparatus of claim 1, wherein the last picture frame in the winding process is determined by said return control means by comparing a number of the wound picture frame with rated picture frame number of the loaded film, and wherein the first picture frame of the rewinding process is set to be adjacent to said last frame in the winding process on the leading side of the last frame.

* * * * *

UNITED STATES PATENT AND TRADEMARK OFFICE
CERTIFICATE OF CORRECTION

PATENT NO.   : 4,903,060
DATED        : February 20, 1990
INVENTOR(S)  : Yasushi Hoshino et al.

It is certified that error appears in the above-identified patent and that said Letters Patent is hereby corrected as shown below:

Claim 2, Column 8, Line 68, "frame" should be --frames--.

Signed and Sealed this

Fifteenth Day of September, 1992

Attest:

DOUGLAS B. COMER

*Attesting Officer*   Acting Commissioner of Patents and Trademarks